United States Patent
Hoshi et al.

(10) Patent No.: US 12,508,527 B2
(45) Date of Patent: Dec. 30, 2025

(54) FILTER HOLDING DEVICE, DEVELOPING DEVICE, PROCESS CARTRIDGE, AND IMAGE FORMING APPARATUS

(71) Applicants: Shohtaroh Hoshi, Kanagawa (JP); Kazuki Yogosawa, Tokyo (JP); Tatsuya Kubo, Kanagawa (JP); Yuta Yabuta, Kanagawa (JP); Hotaru Hashikawa, Kanagawa (JP); Takuya Suganuma, Kanagawa (JP); Takuya Sekine, Kanagawa (JP); Tatsumi Yamada, Kanagawa (JP)

(72) Inventors: Shohtaroh Hoshi, Kanagawa (JP); Kazuki Yogosawa, Tokyo (JP); Tatsuya Kubo, Kanagawa (JP); Yuta Yabuta, Kanagawa (JP); Hotaru Hashikawa, Kanagawa (JP); Takuya Suganuma, Kanagawa (JP); Takuya Sekine, Kanagawa (JP); Tatsumi Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 476 days.

(21) Appl. No.: 17/830,391

(22) Filed: Jun. 2, 2022

(65) Prior Publication Data
US 2022/0395771 A1    Dec. 15, 2022

(30) Foreign Application Priority Data
Jun. 10, 2021 (JP) ................... 2021-097129

(51) Int. Cl.
*B01D 46/00* (2022.01)
*B01D 46/10* (2006.01)

(52) U.S. Cl.
CPC ......... *B01D 46/0005* (2013.01); *B01D 46/10* (2013.01); *B01D 2275/10* (2013.01); *B01D 2275/305* (2013.01); *B01D 2279/45* (2013.01)

(58) Field of Classification Search
CPC .............. B01D 46/0005; B01D 46/10; B01D 2275/10; B01D 2275/305; B01D 2279/45; B01D 2275/203; B01D 46/00
(Continued)

(56) References Cited

U.S. PATENT DOCUMENTS

2010/0196218 A1*  8/2010  Schildermans ........ B01D 39/06
                                                            55/486
2014/0270838 A1   9/2014  Yoshizawa et al.
(Continued)

FOREIGN PATENT DOCUMENTS

JP    2000-075624    3/2000
JP    2011-026723    2/2011
(Continued)

*Primary Examiner* — Jennifer Dieterle
*Assistant Examiner* — Qianping He
(74) *Attorney, Agent, or Firm* — XSENSUS LLP (57) ABSTRACT

A filter holding device includes an opening portion and a filter. The opening portion communicates between an inside and an outside of the filter holding device. The filter is disposed in the opening portion and includes a first side and a second side. The first side is located adjacent to the inside of the filter holding device. The second side is located adjacent to the outside of the filter holding device. The filter has a larger weight density per unit volume at the second side than a weight density per unit volume at the first side and has a larger area of a surface intersecting a communication direction at the second side than an area of a surface intersecting the communication direction at the first side.

13 Claims, 4 Drawing Sheets

(58) Field of Classification Search
USPC .......................... 55/486, 493, 497, 504, 529
See application file for complete search history.

(56) References Cited

U.S. PATENT DOCUMENTS

| | | |
|---|---|---|
| 2020/0301313 A1 | 9/2020 | Suganuma et al. |
| 2022/0107605 A1 | 4/2022 | Hashikawa et al. |
| 2022/0121138 A1 | 4/2022 | Yamada et al. |

FOREIGN PATENT DOCUMENTS

| | | | |
|---|---|---|---|
| JP | 2014-178347 | | 9/2014 |
| JP | 2014178562 A | * | 9/2014 |
| JP | 6872125 B2 | * | 5/2021 |

* cited by examiner

FILTER HOLDING DEVICE, DEVELOPING DEVICE, PROCESS CARTRIDGE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-097129, filed on Jun. 10, 2021, in the Japan Patent Office, the entire disclosure of which is hereby incorporated by reference herein.

BACKGROUND

Technical Field

Embodiments of the present disclosure relate to a filter holding device in which a filter is disposed in an opening portion, a developing device that stores toner, a process cartridge, and an image forming apparatus.

Related Art

Technologies are known in the related art that, in a developing device disposed in an image forming apparatus such as a copier or a printer, a filter is disposed to an opening portion in an upper part of a developing case for the purpose of preventing toner scattering due to an increase of an internal pressure in the developing device.

SUMMARY

In an embodiment of the present disclosure, there is provided a filter holding device that includes an opening portion and a filter. The opening portion communicates between an inside and an outside of the filter holding device. The filter is disposed in the opening portion and includes a first side and a second side. The first side is located adjacent to the inside of the filter holding device. The second side is located adjacent to the outside of the filter holding device. The filter has a larger weight density per unit volume at the second side than a weight density per unit volume at the first side and has a larger area of a surface intersecting a communication direction at the second side than an area of a surface intersecting the communication direction at the first side.

In another embodiment of the present disclosure, there is provided a developing device that contains toner inside to develop a latent image formed on a surface of an image bearer and includes the filter holding device.

In still another embodiment of the present disclosure, there is provided a process cartridge that includes the developing device and the image bearer, and is detachably attached to an apparatus body of an image forming apparatus.

In still yet another embodiment of the present disclosure, there is provided an image forming device that includes any one of the filter holding device, the developing device, and the process cartridge.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Note that identical reference numerals are assigned to identical or equivalent components and a redundant description of those components may be simplified or omitted.

Figure 1:
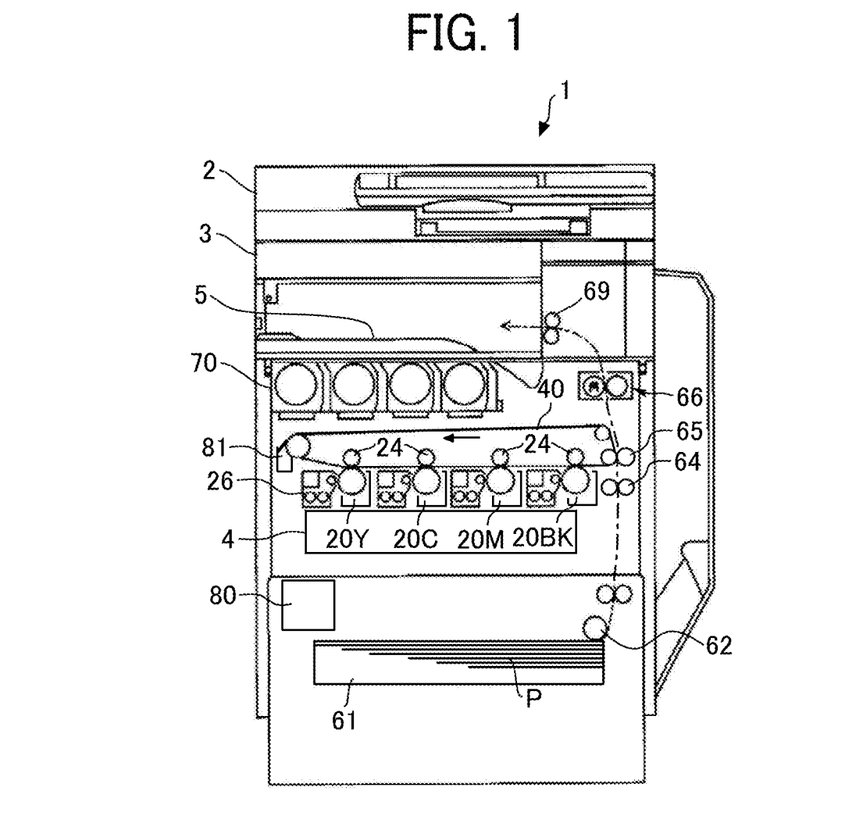
FIG. 1 is a diagram illustrating an overall configuration of an image forming apparatus according to an embodiment of the present disclosure.

Referring now to FIG. 1, a description is given of an overall configuration and operation of an image forming apparatus 1 according to an embodiment of the present disclosure. The image forming apparatus 1 according to the present embodiment is a tandem multicolor image forming apparatus in which process cartridges 20Y, 20M, 20C, and 20BK are arranged in parallel to each other, facing an intermediate transfer belt 40. In each of the process cartridges 20Y, 20M, 20C, and 20BK, a developing device 26 as a filter holding device (a device with a filter) is disposed to face a photoconductor drum 21 as illustrated in FIG. 2.

FIG. 1 illustrates an apparatus body of the image forming apparatus 1, which is a color copier in the present embodiment. The image forming apparatus 1 includes a document conveying device 2, a document reading device 3, and a writing device 4 (exposure device). The document conveying device 2 conveys documents to the document reading device 3. The document reading device 3 scans image data of the documents. The writing device 4 emits a laser beam according to input image data. Yellow, magenta, cyan and black toner images are formed on the surfaces of the photoconductor drums 21 of the process cartridges 20Y, 20M, 20C, and 20BK, respectively. The yellow, magenta, cyan and black toner images on the photoconductor drums 21 are transferred onto the intermediate transfer belt 40 and superimposed. The image forming apparatus 1 further includes a sheet feeder 61, a secondary transfer roller 65, and a fixing device 66. The sheet feeder 61 stores sheets P such as paper sheets. The secondary transfer roller 65 transfers the toner images formed on the intermediate transfer belt 40 onto a sheet P. The fixing device 66 fixes an unfixed toner image on the sheet P. The image forming apparatus 1 still further includes toner containers 70, cleaning devices 23, an intermediate transfer belt cleaner 81, and a waste-toner container 80. The toner containers 70 supply toner of the four colors to the respective developing devices 26 of the process cartridges 20Y, 20M, 20C, and 20BK. The waste-toner container 80 collects toner collected by the cleaning devices 23 (see FIG. 2) and untranferred toner collected by the intermediate transfer belt cleaner 81.

Figure 2:
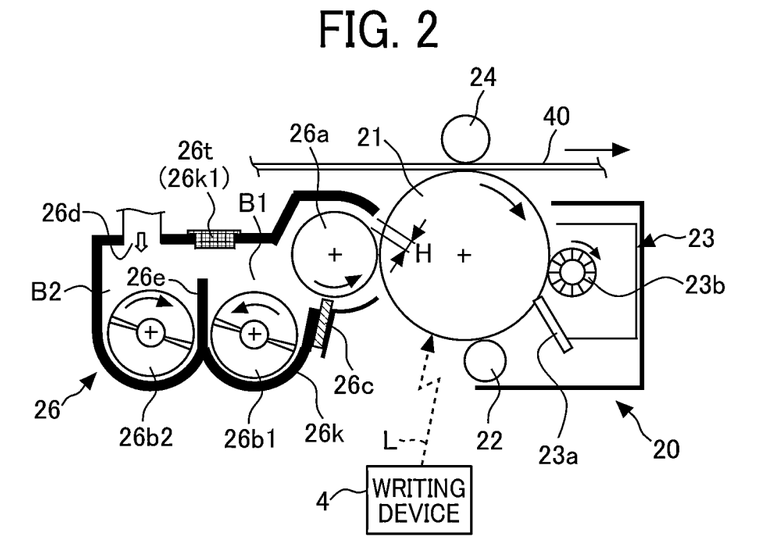
FIG. 2 is a cross-sectional view of an image forming device of the image forming apparatus of FIG. 1.

Each of the process cartridges 20Y, 20M, 20C, and 20BK includes the photoconductor drum 21 as an image bearer, a charging device 22, and the cleaning device 23, which are united as a single unit as illustrated in FIG. 2. Each of the process cartridges 20Y, 20M, 20C, and 20BK, which is expendable, is removed from the apparatus body of the image forming apparatus 1 and replaced with a new one when depleted in the apparatus body of the image forming apparatus 1. The developing device 26 is disposed to face the photoconductor drum 21 in each of the process cartridges 20Y, 20M, 20C, and 20BK. Each of the developing devices 26, which is expendable, is removed from the apparatus body of the image forming apparatus 1 and replaced with a new one when depleted in the apparatus body of the image forming apparatus 1. An operator may independently perform an attachment and detachment operation of the developing device 26 with respect to the apparatus body of the image forming apparatus 1, and an attachment and detachment operation of the process cartridges 20Y, 20M, 20C, and 20BK with respect to the apparatus body of the image forming apparatus 1, as different operations. In the process cartridges 20Y, 20M, 20C, and 20BK, the yellow, magenta, cyan, and black toner images are formed on the respective photoconductor drums 21 as the image bearers.

A description is given below of operations of the image forming apparatus 1 to form a normal color toner image. A conveying roller of the document conveying device 2 conveys a document from a document table onto an exposure glass of the document reading device 3. The document reading device 3 optically scans image data for the document on the exposure glass. The yellow, magenta, cyan, and black image data are transmitted to the writing device 4. The writing device 4 irradiates the surface of the photoconductor drums 21 (see FIG. 2) of the process cartridges 20Y, 20M, 20C, and 20BK with laser beams (as exposure light) L according to the yellow, magenta, cyan, and black image data, respectively.

Meanwhile, the four photoconductor drums 21 rotate clockwise in FIGS. 1 and 2. The surface of the photoconductor drum 21 is uniformly charged at a position opposite the charging device 22 (a charging roller) (in a charging process). Thus, the surface of the photoconductor drum 21 is charged to a charging potential. When the charged surface of the photoconductor drum 21 reaches a position to receive the laser beam L emitted from the writing device 4, an electrostatic latent image is formed on the surface of the photoconductor drum 21 according to the image data (in an exposure process).

The laser beam L corresponding to the yellow image data is emitted to the surface of the photoconductor drum 21 in the process cartridge 20Y, which is the first from the left in FIG. 1 among the four process cartridges 20Y, 20M, 20C, and 20BK. A polygon minor that rotates at high velocity directs the laser beam L for the yellow image data to the surface of the photoconductor drum 21 along an axial direction of the photoconductor drum 21 (i.e., the main scanning direction). Thus, an electrostatic latent image corresponding to the yellow image data is formed on the photoconductor drum 21 charged by the charging device 22. Similarly, the laser beam L corresponding to the cyan image data is emitted to the surface of the photoconductor drum 21 in the second process cartridge 20C from the left in FIG. 1, thus forming an electrostatic latent image corresponding to the cyan image data on the surface of the photoconductor drum 21. The laser beam L corresponding to the magenta image data is emitted to the surface of the photoconductor drum 21 in the third process cartridge 20M from the left in FIG. 1, thus forming an electrostatic latent image corresponding to the magenta image data on the surface of the photoconductor drum 21. The laser beam L corresponding to the black image data is emitted to the surface of the photoconductor drum 21 in the fourth process cartridge 20BK from the left in FIG. 1, thus forming an electrostatic latent image corresponding to the black image data on the surface of the photoconductor drum 21.

Then, the surface of the photoconductor drum 21 bearing the electrostatic latent image for each color reaches a position opposite the developing device 26. The developing device 26 supplies toner onto the surface of the photoconductor drum 21 and develops the electrostatic latent image on the photoconductor drum 21 into a toner image (in a development process). After the development process, the surface of the photoconductor drum 21 reaches a position opposite the intermediate transfer belt 40. Each of primary transfer rollers 24 is disposed at the position where the surface of the photoconductor drum 21 faces the intermediate transfer belt 40 such that the primary transfer roller 24 contacts an inner circumferential surface of the intermediate transfer belt 40. At the positions of the primary transfer rollers 24, the toner images on the photoconductor drums 21 are sequentially transferred to and superimposed on the intermediate transfer belt 40, forming a multicolor toner image thereon (in a primary transfer process).

After the primary transfer process, the surface of the photoconductor drum 21 reaches a position opposite the cleaning device 23. The cleaning device 23 collects untransferred toner remaining on the photoconductor drum 21 (in a cleaning process). The untransferred toner collected in the cleaning device 23 passes through a waste-toner conveyance tube and is collected as waste toner in the waste-toner container 80. Subsequently, a residual potential of the surface of the photoconductor drum 21 is removed at a position opposite a discharging device. Thus, a series of image forming processes performed on the photoconductor drum 21 is completed.

Meanwhile, the surface of the intermediate transfer belt 40, onto which the single-color toner images on the photoconductor drums 21 are transferred and superimposed, moves in a direction indicated by an arrow in FIG. 1 and reaches a position opposite the secondary transfer roller 65. The secondary transfer roller 65 secondarily transfers the multicolor toner image on the intermediate transfer belt 40 onto the sheet P (in a secondary transfer process). After the secondary transfer process, the surface of the intermediate transfer belt 40 reaches a position opposite the intermediate transfer belt cleaner 81. The intermediate transfer belt cleaner 81 collects untransferred toner on the intermediate transfer belt 40 to complete a series of transfer processes on the intermediate transfer belt 40. The untransferred toner collected in the intermediate transfer belt cleaner 81 passes through the waste-toner conveyance tube and is collected as waste toner in the waste-toner container 80.

The sheet P is conveyed from the sheet feeder 61 to the position of the secondary transfer roller 65 via a registration roller pair 64. Specifically, a feed roller 62 feeds the sheet P from the top of multiple sheets P stored in the sheet feeder 61. The sheet P is conveyed to the registration roller pair 64 through a sheet conveyance passage. The sheet P that has reached the registration roller pair 64 is conveyed toward the position of the secondary transfer roller 65 so that the sheet P coincides with the arrival of the multicolor toner image on the intermediate transfer belt 40.

Subsequently, the sheet P, onto which the multicolor image is transferred, is conveyed to the fixing device 66. The fixing device 66 includes a fixing roller and a pressure roller. In a nip between the fixing roller and the pressure roller in pressure contact with each other, the multicolor toner image is fixed on the sheet P. After the fixing process, an output roller pair 69 ejects the sheet P as an output image outside the apparatus body of the image forming apparatus 1. The ejected sheets P are stacked on an output tray 5. Thus, a series of image forming processes is completed.

Next, with reference to FIGS. 2 and 3, the image forming devices of the image forming apparatus according to the present embodiment are described in detail below. The four image forming devices disposed in the apparatus body of the image forming apparatus 1 (see FIG. 1) have a similar configuration except the colors of the toner used in the image forming processes. Thus, parts of the image forming device such as the process cartridge and the developing device are illustrated without suffixes Y, M, C, and BK, which denote the colors of the toner, in the drawings.

As illustrated in FIG. 2, the process cartridge 20 mainly includes the photoconductor drum 21 as the image bearer, the charging device 22, and the cleaning device 23, which are stored in a case of the process cartridge 20 as a single unit. The photoconductor drum 21 is an organic photoconductor designed to be charged with a negative polarity and includes a photosensitive layer formed on a drum-shaped conductive support. The charging device 22 is a charging roller including a conductive core and an elastic layer of moderate resistivity overlaid on the outer circumference of the conductive core. A power supply applies a predetermined voltage to the charging device 22 (as a charging roller). Thus, the charging device 22 uniformly charges the surface of the photoconductor drum 21 facing the charging device 22. The cleaning device 23 includes a cleaning blade 23a and a cleaning roller 23b that contact the photoconductor drum 21. For example, the cleaning blade 23a is made of rubber, such as urethane rubber, and contacts the surface of the photoconductor drum 21 at a predetermined angle with a predetermined pressure. The cleaning roller 23b is a brush roller in which brush bristles are provided around a core.

Figure 3:
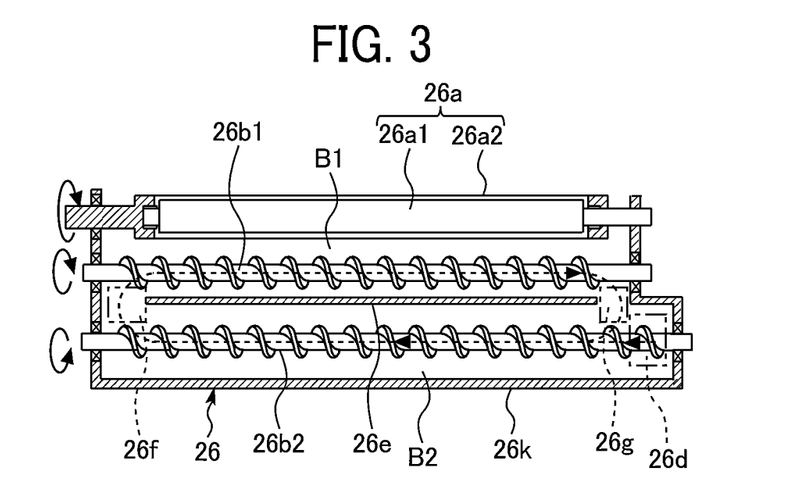
FIG. 3 is a view of a developing device in a longitudinal direction of the developing device included in the image forming apparatus of FIG. 1.

As illustrated in FIGS. 2 and 3, the developing device 26 mainly includes a developing roller 26a as a developer bearer, a first conveying screw 26b1 as a first conveyor facing the developing roller 26a, a partition 26e, a second conveying screw 26b2 as a second conveyor facing the first conveying screw 26b1 via the partition 26e, and a doctor blade 26c as a developer regulator facing the developing roller 26a to regulate an amount of developer borne on the developing roller 26a. The developing device 26 in the present embodiment also functions as a filter holding device that holds a filter 26t (as a toner filter). A detailed description of the developing device 26 serving as a filter holding device is deferred.

The developing device 26 stores a two-component developer including carrier and toner. The developing roller 26a faces the photoconductor drum 21 with a small gap, thereby forming a developing area. As illustrated in FIG. 3, the developing roller 26a includes a magnet 26a1 secured inside and a sleeve 26a2 that rotates around the magnet 26a1. The magnet 26a1 generates multiple poles (magnetic poles) around an outer circumferential surface of the developing roller 26a.

The first conveying screw 26b1 and the second conveying screw 26b2 as conveyors convey the developer stored in the developing device 26 in a longitudinal direction of the developing device 26, thereby establishing a circulation passage indicated by the dashed arrow in FIG. 3. In other words, the first conveying screw 26b1 establishes a first conveyance passage B1, whereas the second conveying screw 26b2 establishes a second conveyance passage B2. The circulation passage of the developer includes the first conveyance passage B1 and the second conveyance passage B2. The partition 26e is an inner wall and separates the first conveyance passage B1 from the second conveyance passage B2. The first conveyance passage B1 and the second conveyance passage B2 communicate with each other via a first communication opening 26f and a second communication opening 26g disposed at both longitudinal ends of the first conveyance passage B1 and the second conveyance passage B2. Specifically, with reference to FIG. 3, in a conveyance direction of the developer, an upstream end of the first conveyance passage B1 communicates with a downstream end of the second conveyance passage B2 via the first communication opening 26f On the other hand, in the conveyance direction of the developer, a downstream end of the first conveyance passage B1 communicates with an upstream end of the second conveyance passage B2 via the second communication opening 26g. That is, the partition 26e is disposed along the circulation passage except the both longitudinal ends of the circulation passage. The first conveying screw 26b1 (or the first conveyance passage B1) is disposed facing the developing roller 26a. The second conveying screw 26b2 (or the second conveyance passage B2) is disposed facing the first conveying screw 26b1 (or the first conveyance passage B1) via the partition 26e. The first conveying screw 26b1 supplies developer toward the developing roller 26a and collects the developer separated from the developing roller 26a after the development process while conveying the developer in the longitudinal direction of the developing device 26. The second conveying screw 26b2 stirs and mixes the developer after the development process conveyed from the first conveyance passage B1 with fresh toner supplied from a toner supply inlet 26d while conveying the developer and the fresh toner in the longitudinal direction of the developing device 26. In the present embodiment, the two conveying screws (i.e., the first conveying screw 26b1 and the second conveying screw 26b2) are horizontally arranged in parallel. Each of the two conveying screws (i.e., the first conveying screw 26b1 and the second conveying screw 26b2) includes a shaft and a screw blade wound around the shaft.

With reference to FIGS. 2 and 3, a description is given in further detail of the image forming processes described above, focusing on the development process. The developing roller 26a rotates in a direction indicated by an arrow in FIG. 2. As illustrated in FIGS. 2 and 3, the first conveying screw 26b1 and the second conveying screw 26b2 are disposed facing each other with the partition 26e interposed therebetween and rotate in directions indicated by arrows in FIGS. 2 and 3. Toner is supplied from the toner container 70 to the toner supply inlet 26d through a toner supply passage. As the first conveying screw 26b1 and the second conveying screw 26b2 rotate in the respective directions in FIG. 2, the developer stored in the developing device 26 circulates together with the supplied toner in the longitudinal direction of the developing device 26 (i.e., the direction indicated by the dashed arrow in FIG. 3) while being stirred and mixed with the supplied toner. The toner is charged by friction with carrier in the developer and electrostatically attracted to the carrier. Then, the toner is scooped up on the developing roller 26a together with the carrier by a developer scooping pole generated on the developing roller 26a. The developer borne on the developing roller 26a is conveyed in the counterclockwise direction indicated by the arrow in FIG. 2 to a position opposite the doctor blade 26c. The doctor blade 26c adjusts the amount of the developer on the developing roller 26a to a proper amount at the position. Subsequently, the rotation of the sleeve 26a2 of the developing roller 26a conveys the developer to the developing area in which the developing roller 26a faces the photoconductor drum 21. The toner in the developer is attracted to the electrostatic latent image formed on the photoconductor drum 21 due to the effect of an electric field generated in the developing area. Thereafter, as the sleeve 26a2 rotates, the developer remaining on the developing roller 26a reaches above the first conveyance passage B1 and is separated from the developing roller 26a. The electric field in the developing area is generated by a specified voltage (in other words, a development bias) applied to the developing roller 26a by a development power supply and a surface potential (in other words, a latent image potential) formed on the surface of the photoconductor drum 21 in the charging process and the exposure process.

The toner in the toner container 70 is supplied as appropriate through the toner supply passage to the developing device 26 via the toner supply inlet 26d as the toner in the developing device 26 is consumed. The toner consumption in the developing device 26 is detected by a toner concentration sensor that magnetically detects a toner concentration in the developer (i.e., the proportion of the toner in the developer) in the developing device 26. The toner supply inlet 26d is disposed above an end of the second conveying screw 26b2 (or the second conveyance passage B2) in a longitudinal direction of the second conveying screw 26b2 (i.e., a lateral direction in FIG. 3).

Figure 4A:
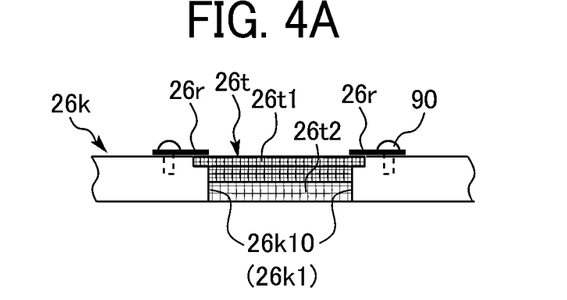
FIG. 4A is an enlarged cross-sectional view of an opening portion of the developing device in which a filter is disposed.

The configuration and operation of the developing device 26 as the filter holding device according to the present embodiment are described in detail below. With reference to FIGS. 2 and 4A, the developing device 26 in the present embodiment functions as the filter holding device in which the filter 26t is disposed in an opening portion 26k1 as a communication port between an inside and an outside of the developing device 26. Specifically, the opening portion 26k1 (vent) through which air passes from the inside to the outside the developing device 26 is formed on the ceiling of a developing case 26k (housing) of the developing device 26. The filter 26t is disposed to close the opening portion 26k1. The filter 26t collects toner as powder and ventilates the developing device 26. In other words, the opening portion 26k1 (vent) through which air passes from the inside to the outside of the developing device 26 is formed in the developing case 26k. The filter 26t is disposed with the opening portion 26k1 as a mounting portion. In the present embodiment, the opening portion 26k1 is opened in a substantially rectangular shape. The filter 26t, which is in a single state, is formed in a substantially rectangular shape (with a flange 26t11 formed at an upper side of the filter 26t).

A casing gap H between the developing roller 26a and the developing case 26k downstream from the development area in the direction of rotation of the developing roller 26a is set to be within a range of 0.6 mm to 1.0 mm. If the casing gap H is smaller than 0.6 mm, the developer borne on the developing roller 26a after the development process may not be smoothly conveyed through the casing gap H between the developing roller 26a and the developing case 26k. As a result, the developer is likely to overflow and leak to the outside of the developing device 26. On the other hand, if the casing gap H is larger than 1.0 mm, the developer borne on the developing roller 26a is not likely to be in sliding contact with an inner circumferential surface of the developing case 26k, hardly generating a suction airflow toward the inside of the developing device 26 due to a pump action. As a result, the toner is likely to scatter from the developing device 26 to the periphery of the development area. The casing gap H kept within an appropriate range reduces leakage of the developer and prevents the toner from scattering. The internal pressure of the developing device 26 is likely to increase due to the suction airflow through the casing gap H described above. If the internal pressure increases, the toner may scatter from gaps of the developing device 26. To address such a situation, in the present embodiment, the developing case 26k has the opening portion 26k1 provided with the filter 26t to ventilate only air while collecting the toner and preventing the toner from scattering to the outside. Accordingly, the increase of the internal pressure of the developing device 26 is reduced. In short, this configuration prevents toner scattering caused by the increase of the internal pressure of the developing device 26.

In the present embodiment, the filter 26t has a lower weight density per unit volume at a first side (lower side in FIG. 4A) of the filter 26t than a weight density per unit volume at a second side (upper side in FIG. 4A) of the filter 26t. The filter 26t is formed such that an area of a surface intersecting a communication direction (in the present embodiment, a surface orthogonal to the communication direction) at the second side (upper side in FIG. 4A) is larger than an area of a surface intersecting the communication direction at the first side (lower side in FIG. 4A). In other words, the filter 26t has an uneven weight density per unit volume. The filter 26t has a portion having a relatively low weight density and a portion having a relatively high weight density in a ventilation direction, which is the communication direction described above. In other words, the filter 26t has a gradient of the weight density per unit volume. In addition, the filter 26t is formed such that an area of a portion (the flange 26t11) at the second side is larger than areas of other portions 26t2 and 26t10. In other words, a cross-sectional area of the filter 26t perpendicular to the ventilation direction (communication direction) is not constant along the ventilation direction. A portion at the second side of the filter 26t has a larger cross-sectional area than the other portions.

In particular, in the present embodiment, the above-described characteristic configuration of the filter 26t is maintained regardless of whether the filter 26t is not disposed in the opening portion 26*k*1 in the single state (see FIG. 4B) or the filter 26*t* is disposed in the opening portion 26*k*1 in the single state (see FIG. 4A).

Figure 4B:
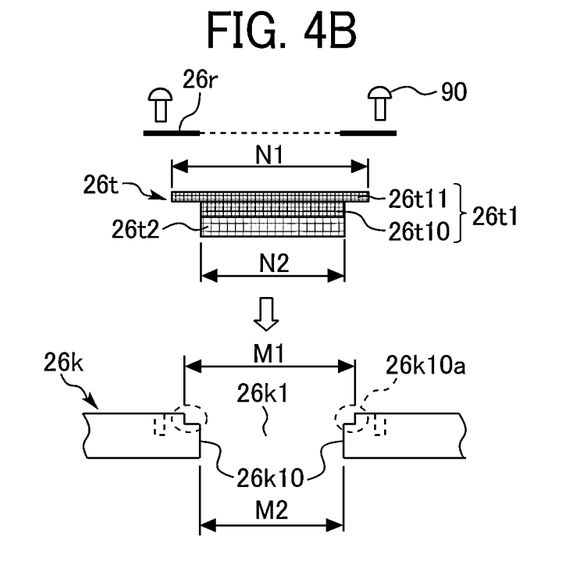
FIG. 4B is an enlarged cross-sectional view of the opening portion of the developing device before the filter is disposed.
Figure 5:
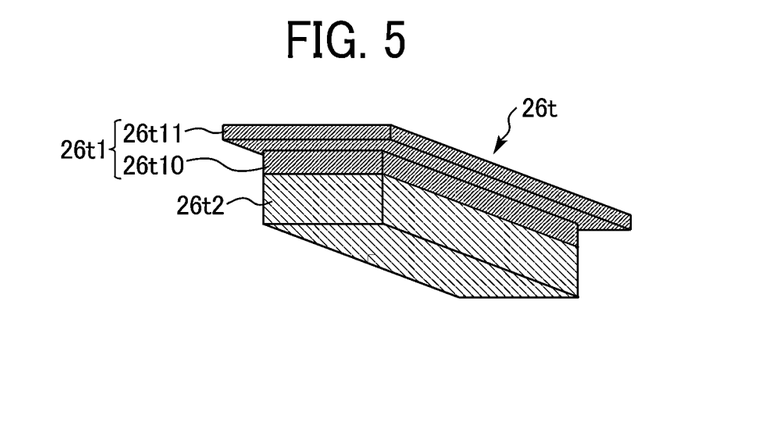
FIG. 5 is a perspective view of the filter.

More specifically, in the present embodiment, the filter 26*t* has a two-layer structure including a low-density portion 26*t*2 having a relatively low weight density per unit volume at the first side and a high-density portion 26*t*1 having a relatively high weight density per unit volume at the second side as illustrated in FIGS. 4A, 4B, and 5. That is, the low-density portion 26*t*2 at the first side of the filter 26*t* has coarse meshes and is relatively fluffy, while the high-density portion 26*t*1 at the second side of the filter 26*t* has meshes in a clogged state. In other words, according to the present embodiment, a toner collecting ability of the high-density portion 26*t*1 of the filter 26*t* is higher than a toner collecting ability of the low-density portion 26*t*2 of the filter 26*t* in the single state.

The filter 26*t* includes the flange 26*t*11 at an end of the second side (upper end in FIG. 4). The flange 26*t*11 protrudes in a direction intersecting the communication direction (in the present embodiment, a direction orthogonal to the communication direction) beyond the other portions 26*t*2 and 26*t*10. Specifically, the filter 26*t* includes the flange 26*t*11 at an end of the second side as a part of the high-density portion 26*t*1. The flange 26*t*11 protrudes in the direction orthogonal to the communication direction beyond the other portions (the low-density portion 26*t*2 and a non-flange portion 26*t*10 of the high-density portion 26*t*1). The high-density portion 26*t*1 includes the flange 26*t*11 and the non-flange portion 26*t*10. The low-density portion 26*t*2 and the non-flange portion 26*t*10 of the high-density portion 26*t*1 are formed in a substantially rectangular parallelepiped shape to have a constant cross-sectional area along the communication direction. The substantially-rectangular-plate-shaped flange 26*t*11 is formed to cover the substantially-rectangular-parallelepiped-shaped portions 26*t*2 and 26*t*10.

In the developing device 26 of the present embodiment, the opening portion 26*k*1 has a rim 26*k*10 (as a wall portion) extending in the communication direction in which air flows from the inside of the developing device 26 to the outside of the developing device 26. The communication direction is the ventilation direction and a vertical direction in FIGS. 2 and 4A. The filter 26*t* is disposed in the opening portion 26*k*1 such that the first side (i.e., the side having a relatively low weight density) is located adjacent to the inside of the developing device 26 (i.e., as the lower side of the filter 26*t* in FIG. 4A), whereas the second side (i.e., the side having a relatively high weight density) is located adjacent to the outside of the developing device 26 (i.e., as the upper side of the filter 26*t* in FIG. 4A).

The filter 26*t* is disposed in the opening portion 26*k*1 such that at least the flange 26*t*11 is in close contact with the rim 26*k*10. Specifically, as illustrated in FIG. 4B, the rim 26*k*10 of the opening portion 26*k*1 has a step portion 26*k*10*a* having a larger opening area than other portions in an upper portion of the opening portion 26*k*1. The flange 26*t*11 is in close contact with the step portion 26*k*10*a* in a state in which the filter 26*t* is set in the opening portion 26*k*1. In other words, the filter 26*t* attached to the opening portion 26*k*1 is in a state in which the flange 26*t*11 is compressed in four directions (the lateral directions in FIG. 4A and the directions perpendicular to the plane on which FIG. 4A is illustrated) by contact with the step portion 26*k*10*a*.

More specifically, as illustrated in FIG. 4B, a length N1 of the flange 26*t*11 of the filter 26*t* in an intersection direction (i.e., the direction orthogonal to the communication direction and a lateral direction in FIG. 4B) is set to be larger than an opening width M1 (length in the intersection direction) of the step portion 26*k*10*a* of the opening portion 26*k*1 in the single state (N1>M1). Such a dimensional relationship between the flange 26*t*11 and the step portion 26*k*10*a* is similarly set for the lengths in the direction perpendicular to the plane on which FIG. 4B is illustrated. Then, as illustrated in FIG. 4A, the flange 26*t*11 of the filter 26*t* is in close contact with the step portion 26*k*10*a* while being compressed conforming to the shape of the step portion 26*k*10*a*.

In the present embodiment, as illustrated in FIG. 4B, a length N2 of the non-flange portion 26*t*10 and the low-density portion 26*t*2 of the filter 26*t* in the intersection direction is set to be slightly larger than an opening width M2 (length in the intersecting direction) of the portions other than the step portion 26*k*10*a* in the opening portion 26*k*1 in the single state (M1>N2>M2). Such a dimensional relationship between a portion other than the flange 26*t*11 of the filter 26*t* and a portion other than the step portion 26*k*10*a* in the opening portion 26*k*1 is similarly set for the lengths in the direction perpendicular to the plane on which FIG. 4B is illustrated. As illustrated in FIG. 4A, the non-flange portion 26*t*10 and the low-density portion 26*t*2 are in close contact with the rim 26*k*10 while being slightly compressed conforming to the shape of the opening portion 26*k*1 (the rim 26*k*10 having the opening width M2). At this time, the low-density portion 26*t*2 is compressed to some extent. However, the magnitude relationship in weight density between the low-density portion 26*t*2 and the high-density portion 26*t*1 is maintained.

In the developing device 26 of the present embodiment, since the portion having a relatively high weight density (in particular, the flange 26*t*11 of the high-density portion 26*t*1) of the filter 26*t* is disposed in close contact with the opening portion 26*k*1 (the step portion 26*k*10*a*), the air (object of discharging) in the developing device 26 is prevented from leaking together with the toner (object of collection) from lateral sides of the filter 26*t* (between the filter 26*t* and the opening portion 26*k*1). Since the function of the filter 26*t* described above is fully performed, the toner (object of collection) is prevented from scattering to the outside of the developing device 26. In particular, since the filter 26*t* includes the low-density portion 26*t*2 having a relatively low weight density per unit volume, the air (object of discharging) in the developing device 26 may leak together with the toner (object of collection) from between the low-density portion 26*t*2 and the opening portion 26*k*1. To address such a situation, in the present embodiment, the flange 26*t*11 of the high-density portion 26*t*1 is disposed in close contact with the opening portion 26*k*1 (step portion 26*k*10*a*). Accordingly, even if the air leaks together with the toner from between the low-density portion 26*t*2 and the opening portion 26*k*1, only air passes through the flange 26*t*11, which collects the toner. Since the flange 26*t*11 is compressed by contacting the step portion 26*k*10*a* so that the weight density is further increased, the effect of collecting the toner is further enhanced. The filter 26*t* is formed such that the weight density increases in the ventilation direction (communication direction), thus facilitating formation of the air flow from the inside to the outside of the developing device 26. Accordingly, the increase of the internal pressure in the developing device 26 is efficiently prevented. The overall toner collection property of the filter 26*t* is enhanced while the filter 26*t* is less likely to be clogged.

In the present embodiment, the flange 26*t*11 of the filter 26*t* (and the step portion 26*k*10*a*) functions to restrict the filter 26*t* from dropping into the developing device 26 from the opening portion 26k1. More specifically, since the flange 26t11 of the filter 26t is caught by the step portion 26k10a of the opening portion 26k1, the filter 26t is prevented from falling into the developing device 26.

In the present embodiment, the filter 26t is attachable from and removable to the outside of the developing device 26. The developing device 26 of the present embodiment includes removable stoppers 26r that contact the outside of the filter 26t (specifically, the high-density portion 26t1 having a relatively high weight density, and more specifically, the flange 26t11) so that the filter 26t does not come off from the opening portion 26k1 (the rim 26k10) to the outside of the developing device 26.

Specifically, when the filter 26t is attached, as illustrated in FIG. 4B, the filter 26t (with the flange 26t11 positioned above) is moved from above the developing device 26 (the opening portion 26k1) in a direction indicated by the white arrow in FIG. 4B. As illustrated in FIG. 4A, the filter 26t is fitted into the opening portion 26k1. In order to prevent the filter 26t from coming off upward, the stoppers 26r are fixed to the developing case 26k by screws 90 (screw fastening) to press the filter 26t from above. In the present embodiment, a plate-shaped member having an opening inside is used as the stopper 26r. The stopper 26r is not limited to such a plate-shaped member having an opening inside as long as the stopper 26r does not impair the function of the filter 26t. As the stopper 26r, for example, a reticulate member having coarse meshes may be used.

Figure 6:
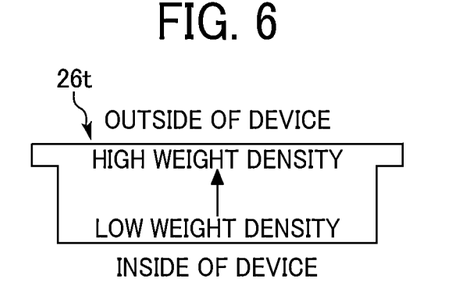
FIG. 6 is a cross-sectional view of a filter according to another embodiment.

In the present embodiment, as the filter 26t, a filter having a two-layer structure including the high-density portion 26t1 and the low-density portion 26t2 is used. On the other hand, as illustrated in FIG. 6, the filter 26t may have a weight density per unit volume gradually increasing in a direction indicated by an arrow in FIG. 6 from the first side adjacent to the inside of the developing device 26 to the second side adjacent to the outside of the developing device 26. In short, the filter 26t has a weight density per unit volume gradually increasing along the ventilation direction, which may be referred to as an exhaust direction. Specifically, the filter 26t illustrated in FIG. 6 is coarse and relatively fluffy at the first side, from which the filter 26t is gradually clogged toward the second side. The filter 26t may be manufactured, for example, by laminating a plurality of layers having different weight densities per unit volume.

First Modification

Figure 7:
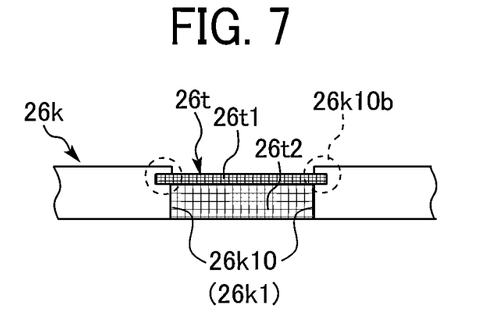
FIG. 7 is an enlarged cross-sectional view of an opening portion of a developing device in which a filter is disposed according to a first modification.

As illustrated in FIG. 7, the developing device 26 according to the first modification has a recess 26k10b (a groove) into which the flange 26t11 of the filter 26t is fitted in the rim 26k10 of the opening portion 26k1. Specifically, the recess 26k10b is formed in a groove shape at a position close to the upper end of the rim 26k10 such that an opening width of the recess 26k10b is larger along a circumferential direction than an opening width of another portion. The filter 26t is temporarily elastically deformed and attached to the opening portion 26k1 such that the flange 26t11 is fitted to (in close contact with) the recess 26k10b. Even in such a case, since the flange 26t11 of the filter 26t is disposed in the opening portion 26k1 in close contact with the rim 26k10 (the recess 26k10b), the air in the developing device 26 is prevented from being discharged outside together with toner. The flange 26t11 fitted in the recess 26k10b in this manner also functions as a restrictor that restricts the filter 26t from falling into the developing device 26 from the opening portion 26k1. The recess 26k10b also functions as a stopper that contacts the filter 26t so that the filter 26t does not come off from the opening portion 26k1 to the outside of the developing device 26. As illustrated in FIG. 7, in the developing device 26 according to the first modification, the filter 26t includes a flange protruding in the direction intersecting the communication direction (in the first modification, the direction orthogonal to the communication direction) beyond another portion, at an end of the second side as the entire high-density portion 26t1. In short, the filter 26t according to the first modification is formed such that the entire high-density portion 26t1 is a flange and the other portion is the low-density portion 26t2. Even in such a configuration, the air in the developing device 26 is prevented from being discharged outside together with the toner.

Second Modification

Figure 8:
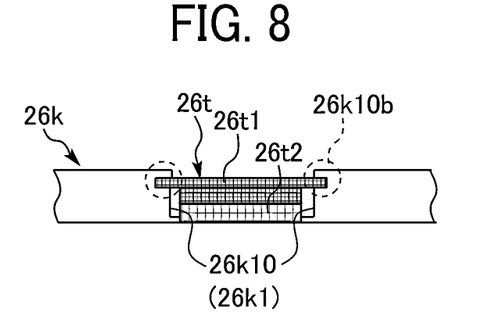
FIG. 8 is an enlarged cross-sectional view of an opening portion of a developing device in which a filter is disposed according to a second modification.

As illustrated in FIG. 8, the developing device 26 according to the second modification has gaps between the portions other than the flange 26t11 of the filter 26t (i.e., the low-density portion 26t2 and the non-flange portion 26t10 of the high-density portion 26t1) and the opening portion 26k1 (the rim 26k10). Even in such a case, since the flange 26t11 of the filter 26t is disposed in the opening portion 26k1 in close contact with the rim 26k10 (the recess 26k10b), the air in the developing device 26 is prevented from being discharged outside together with toner. In particular, in the second modification, since the filter 26t is attached to the opening portion 26k1 without compressing the portions other than the flange 26t11 of the filter 26t, an attachment operation of the filter 26t is facilitated.

As described above, the developing device 26 in the present embodiment is a filter holding device in which the filter 26t is disposed in the opening portion 26k1 as a communication port between the inside and the outside of the developing device 26. The filter 26t is formed such that the weight density per unit volume at the second side of the filter 26t is larger than the weight density per unit volume at the first side of the filter 26t. Further, the area of the surface intersecting (orthogonal to) the communication direction at the second side is larger than the area of the surface intersecting (orthogonal to) the communication direction at the first side. The filter 26t is disposed in the opening portion 26k1 such that the first side of the filter 26t is located adjacent to the inside of the developing device 26 and the second side of the filter 26t is located adjacent to the outside of the developing device 26. Accordingly, the air (object of discharging) in the developing device 26 is prevented from being discharged outside together with toner (object of collection).

In the present embodiment, the process cartridge 20 does not include the developing device 26. The developing device 26 is a unit that is independently attachable to and removable from the apparatus body of the image forming apparatus 1. Alternatively, the developing device 26 may be one of the constituent elements of the process cartridge 20. In this case, the process cartridge 20 including the developing device 26 as an integral part is attachable to and removable from the apparatus body of the image forming apparatus 1. In such a configuration, similar effects to those of the present embodiment are also attained. It is to be noted that the term "process cartridge" used in the present disclosure is defined as a unit that unites an image bearer and at least one of a charging device to charge the image bearer, a developing device to develop a latent image on the image bearer, and a cleaning device to clean the image bearer and that is attachable to and removable from the apparatus body of the image forming apparatus.

In the present embodiment, the developing device 26 includes the two conveying screws (i.e., the first conveying screw 26b1 and the second conveying screw 26b2) as the conveyors horizontally arranged in parallel and the doctor blade 26c disposed below the developing roller 26a. The configuration of the developing device is not limited to the above-described configuration. In the developing device according to one or more embodiments of the present disclosure, three or more conveyors may be horizontally arranged in parallel, multiple conveyors may be arranged in parallel in the vertical direction, or the doctor blade may be disposed above the developing roller. In the present embodiment, the developing device 26 accommodates the two-component developer including toner and carrier. Alternatively, according to one or more embodiments of the present disclosure, the developing device may accommodate one-component developer (i.e., toner, which may include additives). In the present embodiment, the filter 26t is formed such that the area of the surface orthogonal to the communication direction at the second side is larger than the area of the surface orthogonal to the communication direction at the first side. However, the direction intersecting the communication direction is not limited to the orthogonal direction as long as the filter is formed such that the area of the surface intersecting the communication direction at the second side of the filter is larger than the area of the surface intersecting the communication direction at the first side of the filter. Such cases also provide similar effects to those of the present embodiment.

In the present embodiment, the developing device 26 serves as a filter holding device. However, the filter holding device is not limited to the developing device 26. The filter holding device may be any device containing powder such as toner inside, for example, the toner containers 70, the waste-toner container 80, the cleaning devices 23, the intermediate transfer belt cleaner 81, toner supply devices, and toner conveyors. Further, in the present embodiment, the developing device 26 as a filter holding device collects the toner as an object of collection and discharges the air as an object of discharging to the outside of the developing device 26. The combination of the object of discharging and the object of collection of the filter holding device is not limited to the combination described above. For example, the filter holding device may be the apparatus body of the image forming apparatus 1 that collects ozone as an object of collection and discharges air, which does not contain ozone, as an object of discharging to the outside of the image forming apparatus 1. Further, the filter holding device may be a device or an apparatus different from the image forming apparatus 1. Such cases also provide similar effects to those of the present embodiment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A filter holding device comprising:
an opening portion to communicate between an inside and an outside of the filter holding device; and
a filter disposed in the opening portion, the filter including:
   a first side located adjacent to the inside of the filter holding device; and
   a second side located adjacent to the outside of the filter holding device,
the filter having a larger weight density per unit volume at the second side than a weight density per unit volume at the first side,
the filter having a larger cross-sectional area perpendicular to a communication direction at the second side than at the first side,
the filter comprises a flange at the second side, the flange, being a part of the filter, having a first cross-sectional area perpendicular to the communication direction larger than a second cross-sectional area perpendicular to the communication direction of other portions of the filter and having the larger weight density per unit volume than the weight density per unit volume at the first side, and
the opening portion has a rim as a wall portion, the rim having a step portion having a first opening area perpendicular to the communication direction larger than a second opening area perpendicular to the communication direction of other portions of the opening portion,
wherein the flange is in contact with the step portion, the first cross-sectional area of the flange is larger than the first opening area of the opening portion, and the second cross-sectional area of the other portions of the filter is larger than the second opening area of the other portions of the opening portion.

2. The filter holding device according to claim 1,
wherein the filter has a two-layer structure including a low-density portion at the first side and a high-density portion at the second side, and
wherein the low-density portion has a lower weight density per unit volume than the high-density portion.

3. The filter holding device according to claim 2,
wherein the filter includes the flange protruding in a direction intersecting to the communication direction beyond the other portions of the filter than the flange, and
wherein the flange is disposed at an end of the second side in the communication direction and at least a part of the high-density portion.

4. The filter holding device according to claim 1,
wherein the filter includes the flange protruding in a direction intersecting to the communication direction beyond the other portions of the filter than the flange, and
wherein the flange is disposed at an end of the second side in the communication direction.

5. The filter holding device according to claim 3,
wherein the opening portion has the rim extending in the communication direction.

6. The filter holding device according to claim 3,
wherein the flange restricts the filter from dropping into the inside of the filter holding device from the opening portion.

7. The filter holding device according to claim 1, further comprising a stopper that contacts the filter to prevent the filter from coming off from the opening portion to the outside of the filter holding device.

8. The filter holding device according to claim 1,
wherein the filter is attachable to the opening portion from the outside of the filter holding device and removable from the opening portion to the outside of the filter holding device.

9. A developing device configured to contain toner inside to develop a latent image formed on a surface of an image bearer, the developing device comprising the filter holding device according to claim 1.

10. A process cartridge comprising:
the developing device; and
the image bearer according to claim 9,
wherein the process cartridge is detachably attached to an apparatus body of an image forming apparatus.

11. The image forming apparatus comprising the process cartridge according to claim 10.

12. An image forming apparatus comprising the developing device according to claim 9.

13. An image forming apparatus comprising the filter holding device according to claim 1.

* * * * *